US009011162B2

(12) United States Patent
Sato et al.

(10) Patent No.: US 9,011,162 B2
(45) Date of Patent: Apr. 21, 2015

(54) ROTARY CONNECTOR DEVICE

(71) Applicant: Niles Co., Ltd., Tokyo (JP)

(72) Inventors: Yasuhiro Sato, Tokyo (JP); Tomohiro Sato, Tokyo (JP)

(73) Assignee: Valeo Japan Co., Ltd., Tokyo (JP)

( * ) Notice: Subject to any disclaimer, the term of this patent is extended or adjusted under 35 U.S.C. 154(b) by 135 days.

(21) Appl. No.: 13/920,514

(22) Filed: Jun. 18, 2013

(65) Prior Publication Data

US 2013/0344706 A1    Dec. 26, 2013

(30) Foreign Application Priority Data

Jun. 21, 2012 (JP) ................. 2012-140172

(51) Int. Cl.
H01R 39/00 (2006.01)
B60R 16/037 (2006.01)
B60R 16/027 (2006.01)
H01R 35/02 (2006.01)

(52) U.S. Cl.
CPC ............. B60R 16/037 (2013.01); B60R 16/027 (2013.01); H01R 35/025 (2013.01); *H01R 2201/26* (2013.01)

(58) Field of Classification Search
CPC .... H01R 35/025; H01R 35/04; B60R 16/027; B62D 1/10; H02G 11/00
USPC .................................... 439/15, 164
See application file for complete search history.

(56) References Cited

U.S. PATENT DOCUMENTS

| | | | |
|---|---|---|---|
| 4,824,396 A | 4/1989 | Sasaki et al. | |
| 4,936,782 A | 6/1990 | Bannai et al. | |
| 5,226,831 A * | 7/1993 | Horiuchi | 439/164 |
| 5,593,310 A * | 1/1997 | Kawamoto et al. | 439/164 |
| 5,657,940 A | 8/1997 | Ishikawa et al. | |
| 5,674,082 A * | 10/1997 | Okuhara et al. | 439/164 |
| 5,683,259 A * | 11/1997 | Sato | 439/164 |
| 5,690,500 A * | 11/1997 | Ishikawa et al. | 439/164 |
| 5,772,456 A * | 6/1998 | Ohishi | 439/164 |
| 6,343,946 B1 * | 2/2002 | Matsumoto | 439/164 |
| 7,811,108 B2 * | 10/2010 | Oishi et al. | 439/164 |
| 8,033,845 B2 * | 10/2011 | Oishi et al. | 439/164 |
| 2009/0317984 A1* | 12/2009 | Oishi et al. | 439/34 |
| 2009/0317995 A1* | 12/2009 | Oishi et al. | 439/164 |

FOREIGN PATENT DOCUMENTS

| | | |
|---|---|---|
| EP | 1 892 158 A2 | 2/2008 |
| JP | 2001-028286 A | 1/2001 |

OTHER PUBLICATIONS

Extended European Search Report issued Sep. 5, 2013 for corresponding European Application No. 13167313.9-1503.

* cited by examiner

*Primary Examiner* — Abdullah Riyami
*Assistant Examiner* — Vladimir Imas
(74) *Attorney, Agent, or Firm* — Rader, Fishman & Grauer PLLC (57) ABSTRACT

A rotary connector device that can certainly cut a flat cable is disclosed. The rotary connector device comprises a rotor, a stator forming an annular space between the rotor and the stator, and a flat cable provided in the annular space for establishing a connection between the side of the rotor and the side of the stator. The stator includes an annular wall surrounding the annular space, the flat cable has one end which is pulled outside of the annular space through an opening provided in the annular wall, and a first projection portion and a second projection portion are provided in a side edge portion of an opening in the annular wall to project toward the side of the side edge portion positioned at the opposite side centered on the opening.

8 Claims, 7 Drawing Sheets

ROTARY CONNECTOR DEVICE

CROSS-REFERENCE TO RELATED APPLICATION

This application claims priority under 35 USC 119 from Japanese Patent Application No. 2012-140172 filed on Jun. 21, 2012, the disclosure of which is incorporated by reference herein.

BACKGROUND OF THE INVENTION

1. Field of the Invention

The present invention relates to a rotary connector device which establishes an electrical connection between a vehicular body and a steering wheel in an automobile.

2. Description of the Related Art

In some of vehicular rotary connector devices, an annular space is formed between a rotor connected to a steering shaft and a stator fixed to a vehicular body side and a flat cable is arranged in the annular space for establishing a connection between the side of the rotor and the side of the stator.

Figure 6:
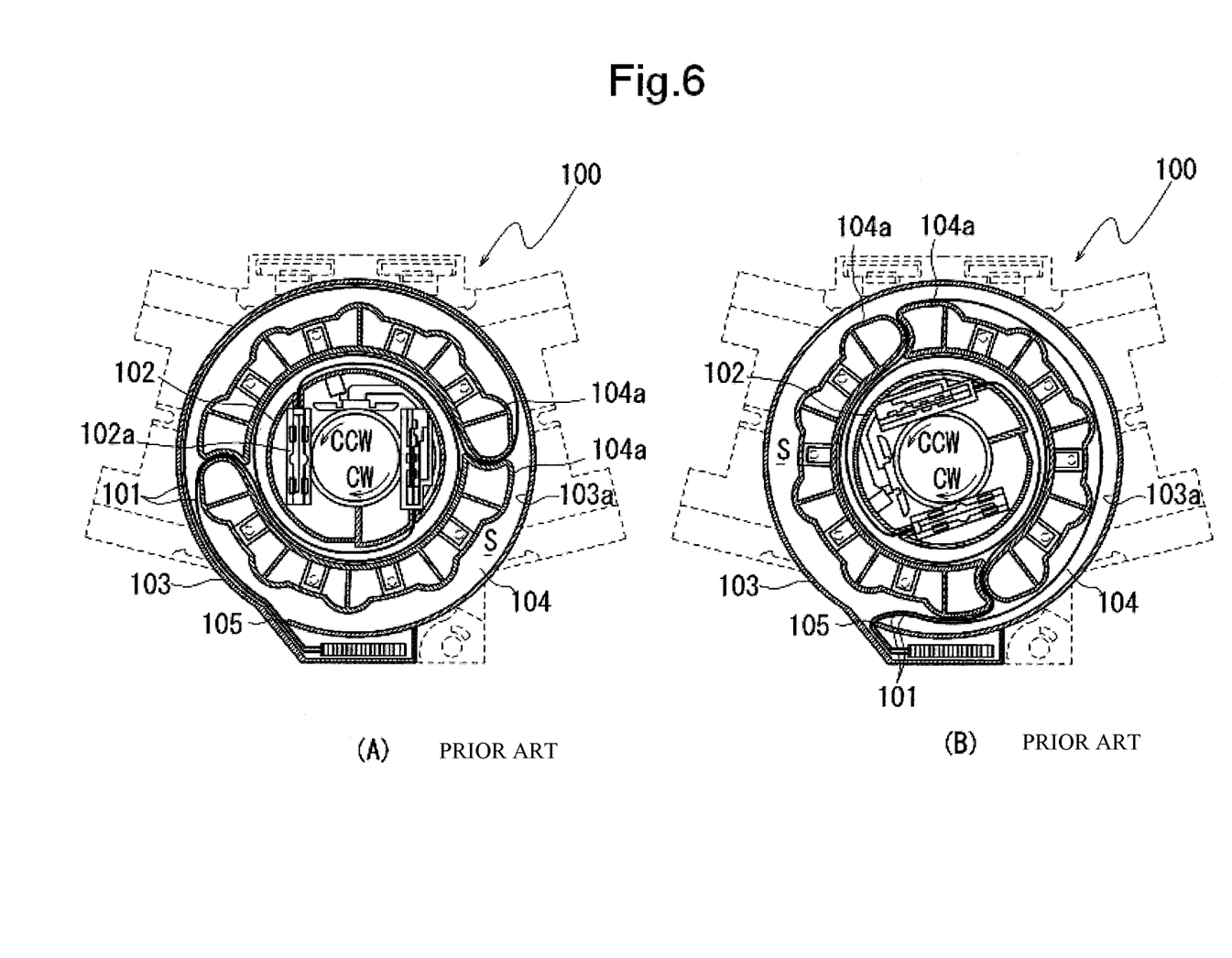
FIG. 6A and FIG. 6B are diagrams explaining an arrangement of a flat cable in a conventional rotary connector device.

FIG. 6A and FIG. 6B are diagrams each schematically explaining an arrangement of a flat cable 101 provided in an annular space S in a conventional rotary connector device 100, wherein FIG. 6A is a diagram showing a state where a spacer 104, which is incorporated in a position (neutral position) where the flat cable 101 can perform two rotations in the right and left directions, is normally incorporated in the rotary connector device 100, and FIG. 6B is a diagram showing a state where the spacer 104 is incorporated in a position (non-neutral position) where the flat cable 101 can not perform two rotations equally in the right and left directions, and a length of the flat cable 101 comes short in the middle of operating an unillustrated steering wheel.

As shown in FIG. 6A, the flat cable 101 goes through between ribs 104a and 104a and is pulled out from an inner diameter side to an outer diameter side of the spacer 104 in the annular space S. The flat cable 101 positioned in the inner diameter side of the spacer 104 is wound in one direction around an outer periphery of a rotor 102, and thereafter is connected to a connector 102a at the side of the rotor. In addition, the flat cable 101 positioned in the outer diameter side of the spacer 104 is wound around the outer periphery of the rotor 102 in the opposite direction to the inner diameter side, and thereafter is pulled out from an opening 105 of an annular wall 103 to an outside of the annular space S, and finally is connected to a connector (not shown) at the side of the stator.

The flat cable 101 is adapted to move between the inner diameter side and the outer diameter side of the spacer 104 in association with an operation of the steering wheel, and a rotatable angle range of the steering wheel is to be defined in accordance with a length of the flat cable 101. The length of the flat cable 101 is set such that the steering wheel can performs at least two rotations in the right and left directions from the neutral position. Therefore at the time of mounting the rotary connector device 100 on a vehicle, the rotary connector device 100 is designed to be incorporated in a steering shaft in a state where the spacer 104 is set in a position (neutral position) such that the flat cable 101 can perform two rotations in the right and left directions. At this time, the rotor is temporarily fixed to the stator by a retainer to prevent the neutral position of the flat cable from deviating (to restrict rotation of the rotor).

Herein, as the problem that the retainer unfastens and the rotor rotates occurs at the incorporating, the rotary connector device 100 possibly results in being incorporated in the steering shaft in a state where the flat cable deviates from the neutral position. In this case, the length of the flat cable comes short in the middle of rotating the steering wheel depending on the deviation amount from the neutral position, thus creating a possibility of interrupting the operation of the steering wheel.

In a case where this event occurs, the flat cable 101 is pulled in association with the operation of the steering wheel to be strongly pressed against the opening 105 of the annular wall 103 (refer to FIG. 6B). Therefore the conventional rotary connector device is configured such that, a cutter is provided in the opening 105, and in a case of occurrence of this event, the flat cable 101 is cut by the cutter, thus preventing the operation of the steering wheel from being interrupted (for example, refer to Japanese Patent Laid-Open Publication No. 2001-28286).

Figure 7:
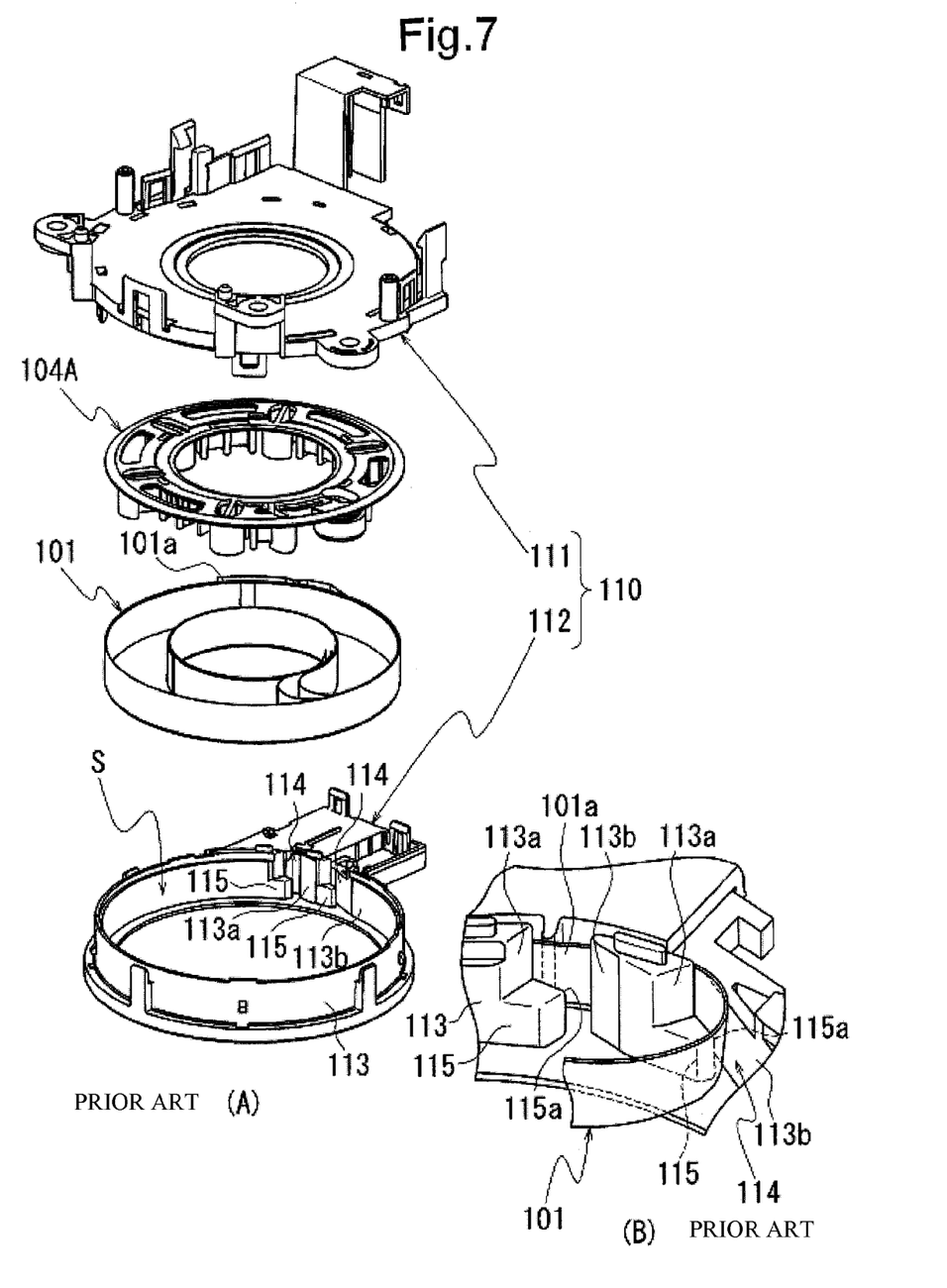
FIG. 7A and FIG. 7B are diagrams explaining a projection (cutter) provided in a stator in the conventional rotary connector device.

FIG. 7A is an exploded perspective view of a stator 110 in a rotary connector device disclosed in Japanese Patent Laid-Open Publication No. 2001-28286, and FIG. 7B is an enlarged diagram showing part of a projection 115 (cutter) provided in a cover 112 of the stator 110 in the rotary connector device.

The stator 110 is provided with a bottom cover 111 mounted and fixed to the vehicular body side and the cover 112 incorporated in the bottom cover 111, and an annular wall 113 is provided in the cover 112 for surrounding an outer periphery of a rotor (not shown) by a predetermined interval. As the cover 112 is incorporated in the bottom cover 111, an annular space S surrounding the outer periphery of the rotor (not shown) is formed inside of the annular wall 113, and a spacer 104A formed in a ring shape as viewed in an axial direction is rotatably accommodated in the annular space S. In addition, the flat cable 101 for connecting the side of the rotor and the side of the stator is provided in a state of being wound around the spacer 104A.

An opening 114 is provided in the annular wall 113 for drawing one end 101a of the flat cable 101 to an outside of the annular space, and the projection 115 (cutter) is provided in one side 113a of the opening 114 in the circumferential direction for cutting the flat cable 101. The projection 115 is provided to project from one side 113a of the opening 114 toward the other side 113b, and is formed in a substantially rectangular shape as viewed in a radial direction.

Here, in a case where a length of the flat cable 101 comes short in the middle of rotating the steering wheel due to the event that the flat cable 101 is wound around the spacer 104A in a state of deviating largely from the neutral position, the flat cable 101 results in being pulled in a direction (left direction in the figure) of making contact with the projection 115. In addition, after a corner portion 115a of the projection 115 makes contact with the flat cable 101, as the flat cable 101 is further pulled, stress concentrates on apart of the flat cable 101 making contact with the corner portion 115a of the projection 115, so that the flat cable 101 is cut centering around the part on which this stress concentrates.

However, for preventing the corner portion 115a of the projection 115 from damaging the flat cable 101 in a case where such an event does not occur, the corner portion 115a is formed in a circular shape. Therefore in a case where the flat cable 101 makes contact with the corner portion 115a, there occurs a problem that the retaining of the flat cable 101 can not be certainly performed. Therefore in a case where the flat cable 101 is pulled out toward the projection 115, in some cases the flat cable 101 deviates toward the part side (upper side in the figure) where the projection 115 is not provided. In this case, the contact position of the corner portion 115a with the flat cable 101 is changed and the stress does not concentrate on a specific part of the flat cable 101. As a result, there are some cases where the flat cable 101 can not be cut.

Therefore, it is required to be able to certainly cut the flat cable 101 when necessary.

SUMMARY OF THE INVENTION

The present invention is made in view of the foregoing problems, and an object of the present invention is to provide a rotary connector device which can certainly cut a flat cable.

According to an aspect of the present invention, a rotary connector device comprises a rotor, a stator forming an annular space between the rotor and the stator, and a flat cable provided in the annular space for establishing a connection between the side of the rotor and the side of the stator, wherein the stator includes an annular wall surrounding the annular space, the flat cable has one end which is pulled outside of the annular space through an opening provided in the annular wall, a projection portion is provided in one of side edges of the opening opposing the annular wall in the circumferential direction to project toward the other side edge, the projection portion includes a first projection formed in a rectangular shape as viewed in a radial direction, and a second projection formed in a peak shape as viewed in the radial direction, and the first projection and the second projection line up in a height direction of the annular wall.

According to the aspect of the present invention, when the flat cable provided to bridge across the inside and the outside of the annular space through the opening is pulled in a direction of being pressed on the first projection and the second projection, the stress due to the first projection and the stress due to the second projection act on the flat cable. Accordingly the acting point of the stress on the flat cable can be increased as compared to a case where only one projection (cutter) is provided for cutting the flat cable. Therefore the flat cable can be more certainly cut. Particularly even in a case where the flat cable deviates toward the side where the flat cable leaves away from the first projection in a height direction of the annular wall at the time the flat cable deviates largely from the neutral position, is wound around the spacer, and is strongly pulled toward the first projection, the flat cable can be more certainly cut by the second projection.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DESCRIPTION OF THE EMBODIMENTS

Hereinafter, an embodiment in the present invention will be explained with reference to the accompanying drawings. It should be noted that in the following explanation, the side of a bottom cover 7 is defined as an upper side and the side of a cover 8 is defined as a lower side in FIG. 1 for descriptive purposes.

Figure 1:
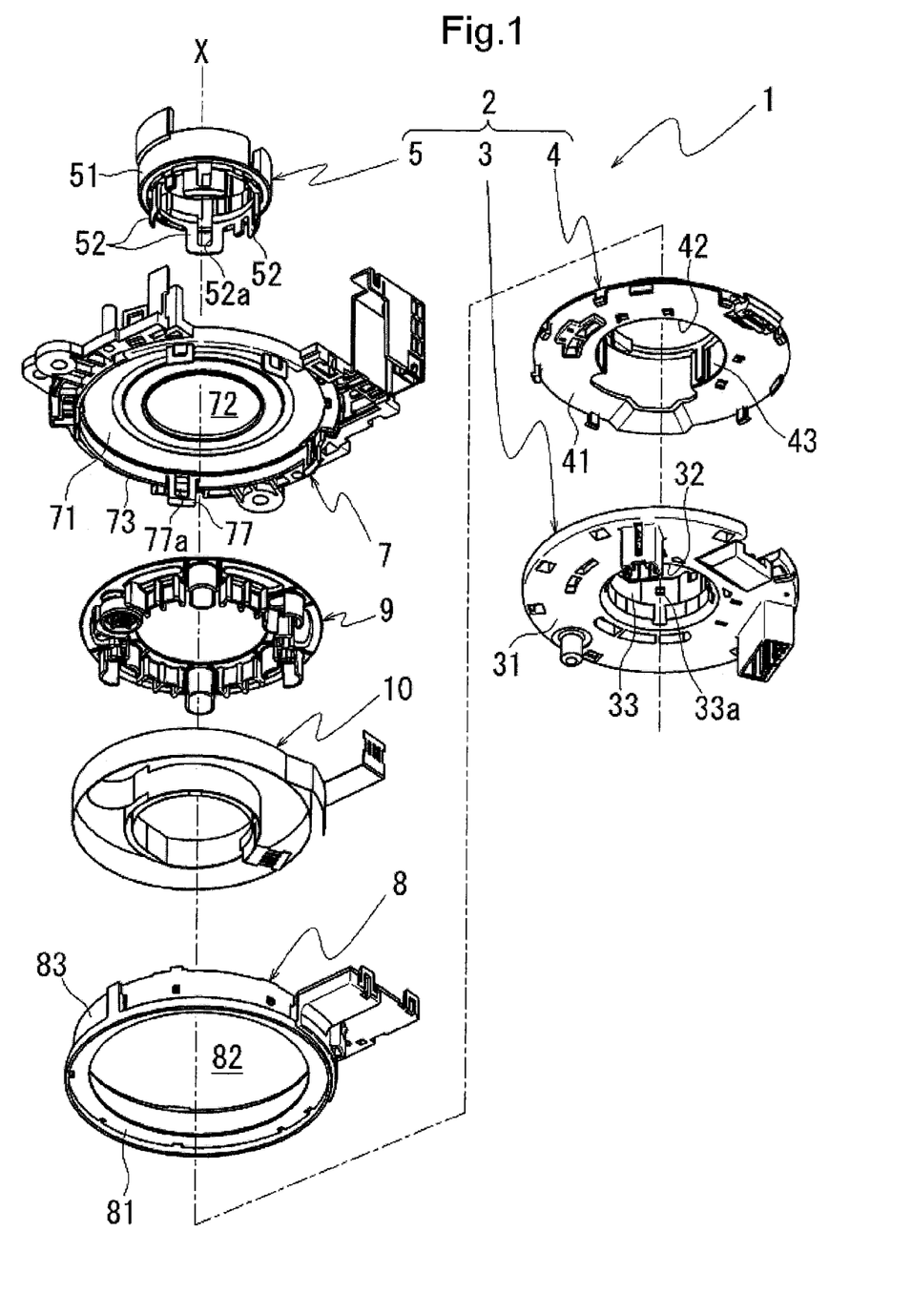
FIG. 1 is an exploded perspective view showing a rotary connector device according to an embodiment in the present invention.

A rotor 2 in a rotary connector device 1 according to an embodiment includes a rotor body 3, a liner 4 and an attachment 5, each of which is made of a resin material. In the rotor body 3, an opening 32 is formed in a central part of a disc-shaped base portion 31, through which an unillustrated steering shaft is inserted, and a cylindrical wall 33 is provided on a surface of the base portion 31 facing the liner 4 to project upwards toward the liner 4 in such a manner as to surround the opening 32 across the entire circumference.

In the liner 4, an opening 42 is formed in a central part of a disc-shaped base portion 41, through which the cylindrical wall 33 in the rotor body 3 is inserted, and a cylindrical wall 43 is provided on a top surface of the base portion 41 facing the attachment 5 to project upwards toward the attachment 5 in such a manner as to surround the opening 42 across the entire circumference. The liner 4 is incorporated in the rotor body 3 to insert the cylindrical wall 43 outside of the cylindrical wall 33 of the rotor body 3.

The attachment 5 is provided with a cylindrical base portion 51, and engagement portions 52 to the cylindrical wall 33 of the rotor body 3 are provided in a lower end of the base portion 51. The engagement portions 52 are formed to project downwards from the base portion 51 toward the rotor body 3, and are provided to be spaced from each other in the circumferential direction around an axis X. An opening 52a is formed in each of the engagement portions 52 such that a projection 33a provided in the cylindrical wall 33 of the aforementioned rotor body 3 is engaged to the opening 52a.

In the embodiment, the attachment 5 is connected to the rotor body 3 by inserting the engagement portion 52 into the cylindrical wall 33 of the rotor body 3 in an axial direction of the axis X. At this time, fitting of the projection 33a in the opening 52a prevents the attachment 5 from dropping from the rotor body 3. In addition, the liner 4 is positioned between the attachment 5 and the rotor body 3 in this state, and the dropping of the liner 4 from the rotor body 3 is also prevented by the attachment 5.

Figure 2:
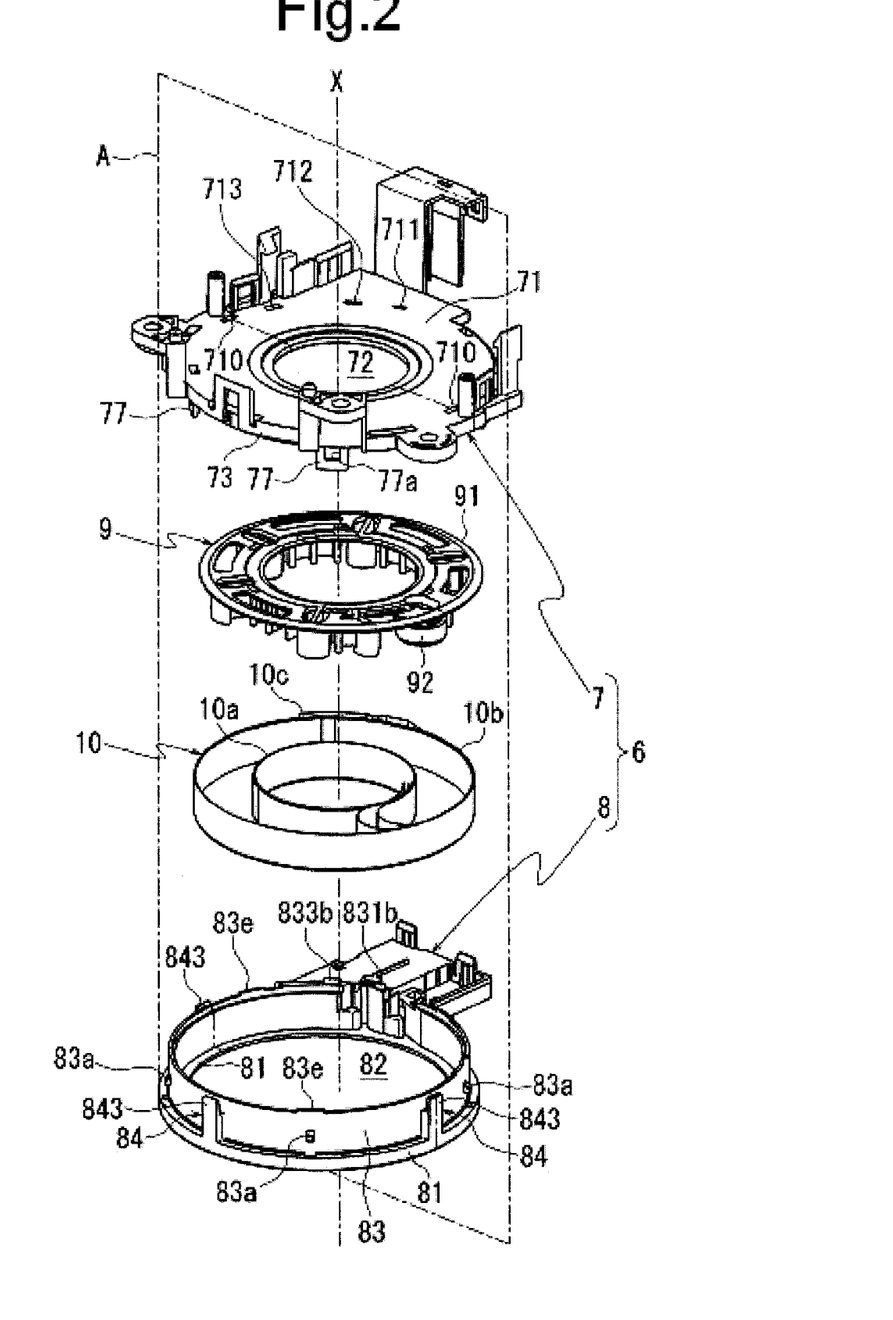
FIG. 2 is an exploded perspective view showing a stator in the rotary connector device according to the embodiment.
Figure 3:
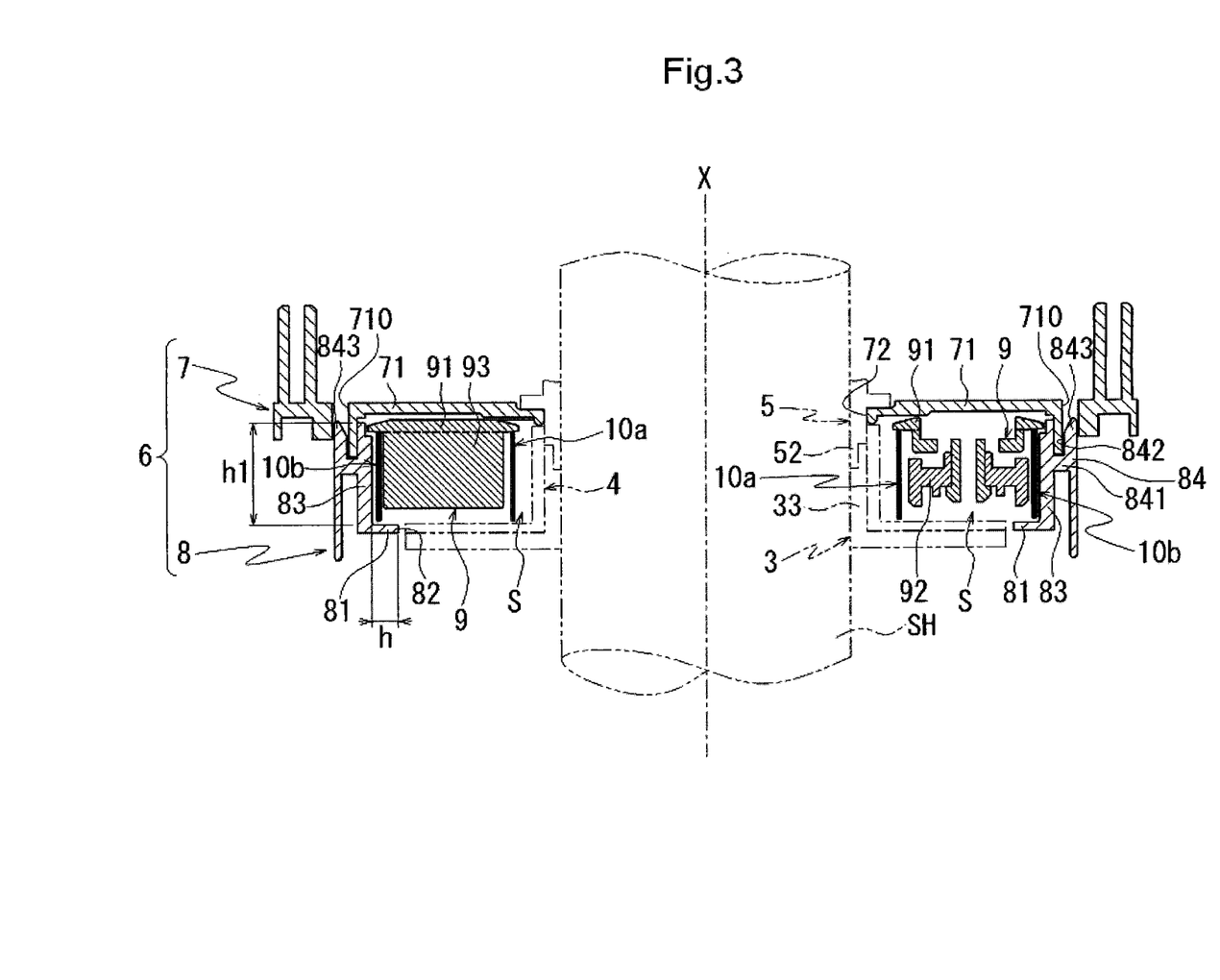
FIG. 3 is a cross section showing the stator according to the embodiment.

FIG. 2 is an exploded perspective view showing a stator 6, and is a diagram showing a bottom cover 7 and a cover 8 forming part of the stator 6, and along with it, a space 9 and a flat cable 10 located between the bottom cover 7 and the cover 8. FIG. 3 is a cross section showing the stator 6 taken along a plane A in FIG. 2, and is a diagram where primary members at the side of the rotor 2 which are incorporated in the stator 6 are schematically shown by a virtual line in the figure.

As shown in FIG. 2 and FIG. 3, the stator 6 includes the bottom cover 7 fixed to the vehicular body side and the cover 8 mounted on a ring-shaped base portion 71 of the bottom cover 7, and these covers 7 and 8 are made of the same resin material (for example, polyacetate). The bottom cover 7 is provided with an opening 72 formed in the central part of the base portion 71, and the cylindrical wall 33 and the engagement portions 52 at the side of the rotor 2 as mentioned above, and a steering shaft SH (refer to FIG. 3) are configured to be inserted into the opening 72.

A fitting wall 73 surrounding the opening 72 by a predetermined interval is provided on a lower surface of the base portion 71 facing the cover 8 to project downwards toward the cover 8, and is inserted outside of an annular wall 83 of the cover 8 to be described later at the time the bottom cover 7 and the cover 8 are incorporated.

As shown in FIG. 2, engagement pieces 77 in a substantially rectangular shape as viewed in a radial direction are provided in a peripheral edge of the base portion 71 to project in a lower direction in the figure, and an engagement hole 77a to which a projection 83a of the cover 8 to be described later is engaged is formed in the engagement piece 77.

The cover 8 includes a ring-shaped base portion 81 and the annular wall 83 projecting from an opposing surface of the base portion 81 to the bottom cover 7. The cover 8 is provided with an opening 82 formed in the central part of the base portion 81, and the cylindrical wall 33 and the engagement portion 52 at the side of the rotor 2 as mentioned above, and the steering shaft SH (refer to FIG. 3) are configured to be inserted into the opening 82.

The annular wall 83 is provided to project upwards toward the bottom cover 7 from a position of being spaced by a predetermined distance h in a radial outside of the opening 82, and is formed at the same height h1 across an entire periphery in the circumferential direction around the axis X. As shown in FIG. 2, the projections 83a are provided on the outer periphery of the annular wall 83 to project toward a radial outside, and the projections 83a are provided to be spaced from each other in the circumferential direction around the axis X. In the embodiment, the projection 83a is engaged to the engagement hole 77a of the engagement piece 77 as described before at the time of incorporating the cover 8 in the bottom cover 7, and the projection 83a engaged to the engagement hole 77a prevents the cover 8 from dropping down from the bottom cover 7.

Further, engagement walls 84 in a rectangular shape as viewed in a radial direction are provided on an outer periphery of the annular wall 83. As shown in FIG. 3, an engagement recessed portion 842 is formed in the engagement wall 84 at an upper side from a connecting portion 841 to the annular wall 83. Since the fitting wall 73 of the bottom cover 7 is engaged to the engagement recessed portion 842 and a top end portion 843 of the engagement wall 84 is fitted in a fitting hole 710 of the bottom cover 7 at the time of incorporating the cover 8 in the bottom cover 7, the cover 8 and the bottom cover 7 are incorporated without a positional deviation in the radial direction of the axis X.

Projections 83e projecting upwards toward the bottom cover 7 are provided on the annular wall 83 to be spaced from each other in the circumferential direction of the annular wall 83, and the projection 83e is fitted in a fitting hole 713 provided in the base portion 71 of the bottom cover 7 at the time of incorporating the cover 8 in the bottom cover 7.

In the embodiment, when the stator 6 is formed by incorporating the cover 8 in the bottom cover 7, the base portion 81 of the cover 8 and the base portion 71 of the bottom cover 7 are arranged to oppose with each other to have an interval therebetween in the axial direction of the axis X. Therefore the annular space S for accommodating the spacer 9 and the flat cable 10 is formed inside of the annular wall 83 in the radial direction (refer to FIG. 3).

The spacer 9 is formed of a resin material having high sliding properties (for example, polyacetale (POM)), and a base portion 91 in a ring shape as viewed in the axial direction is provided with a roller 92 and a guide portion 93 on a lower surface thereof at the side of the cover 8.

The flat cable 10 establishes an electrical connection between an unillustrated connector at the side of the stator and an unillustrated connector at the side of the rotor, and is configured by interposing a plurality of metallic wire plates between adherence surfaces of film substrates having flexible properties. The flat cable 10 is, as similar to the flat cable 101 according to the above-described conventional example (refer to FIG. 6), provided in a state of being wound around the spacer 9 rotatably accommodated in the annular space S. Specifically the flat cable 10 is pulled out from the inner diameter side to the outer diameter side of the spacer 9 through part of the roller 92 of the spacer 9, and is provided in a state where the winding direction is reversed on a basis of part of the roller 92.

Therefore in a case where a flat cable 10a positioned at the inner diameter side of the spacer 9 (flat cable 10a positioned at the side of the rotor 2 of the spacer 9) is wound, for example, in a counterclockwise direction as viewed in the axial direction, a flat cable 10b positioned at the outer diameter side of the spacer 9 (flat cable 10b positioned at the side of the annular wall 83 of the spacer 9) is wound in a clockwise direction as viewed in the axial direction.

Figure 4:
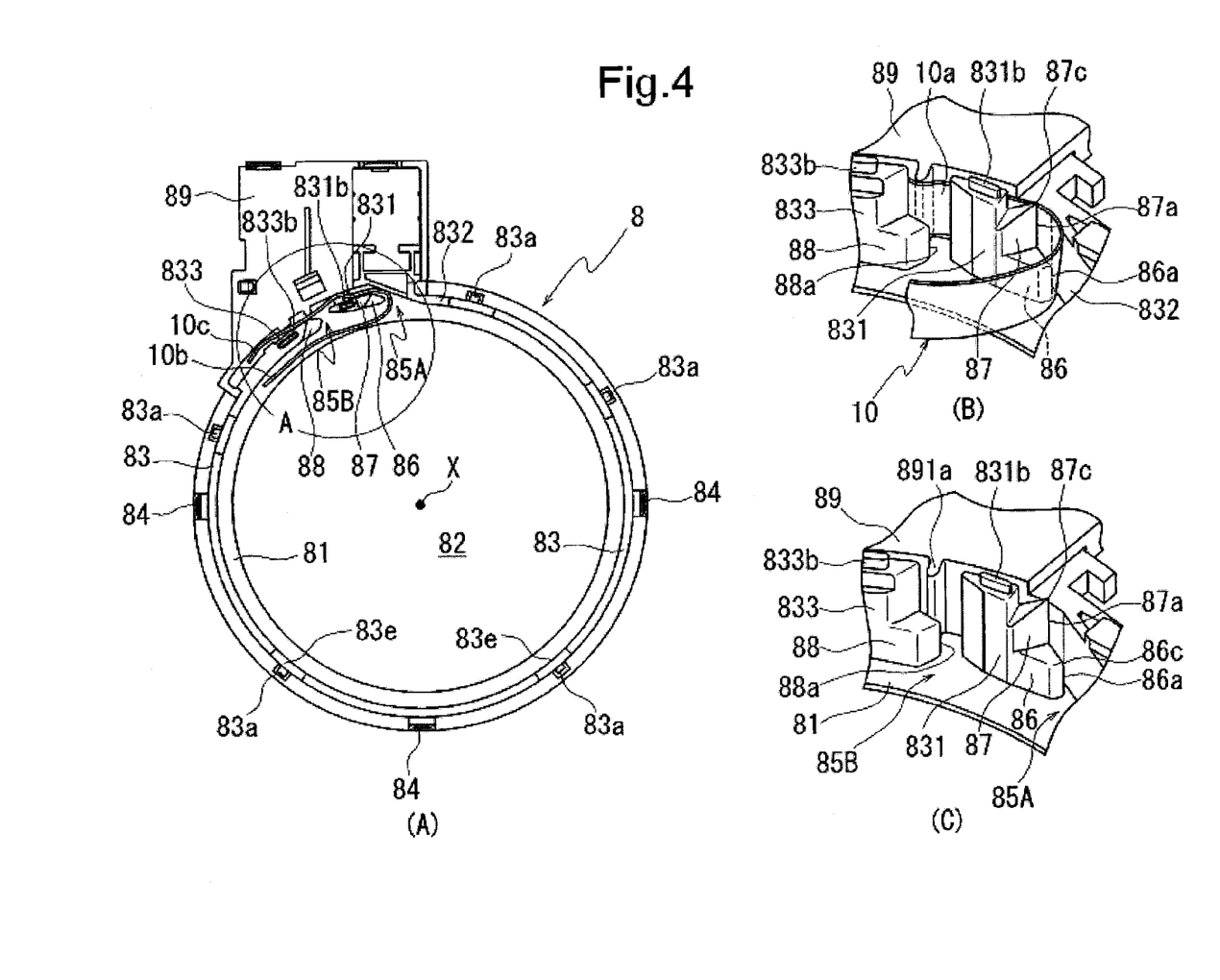
FIG. 4A, FIG. 4B and FIG. 4C are diagrams explaining a projection (cutter) provided in the stator according to the embodiment.
Figure 5:
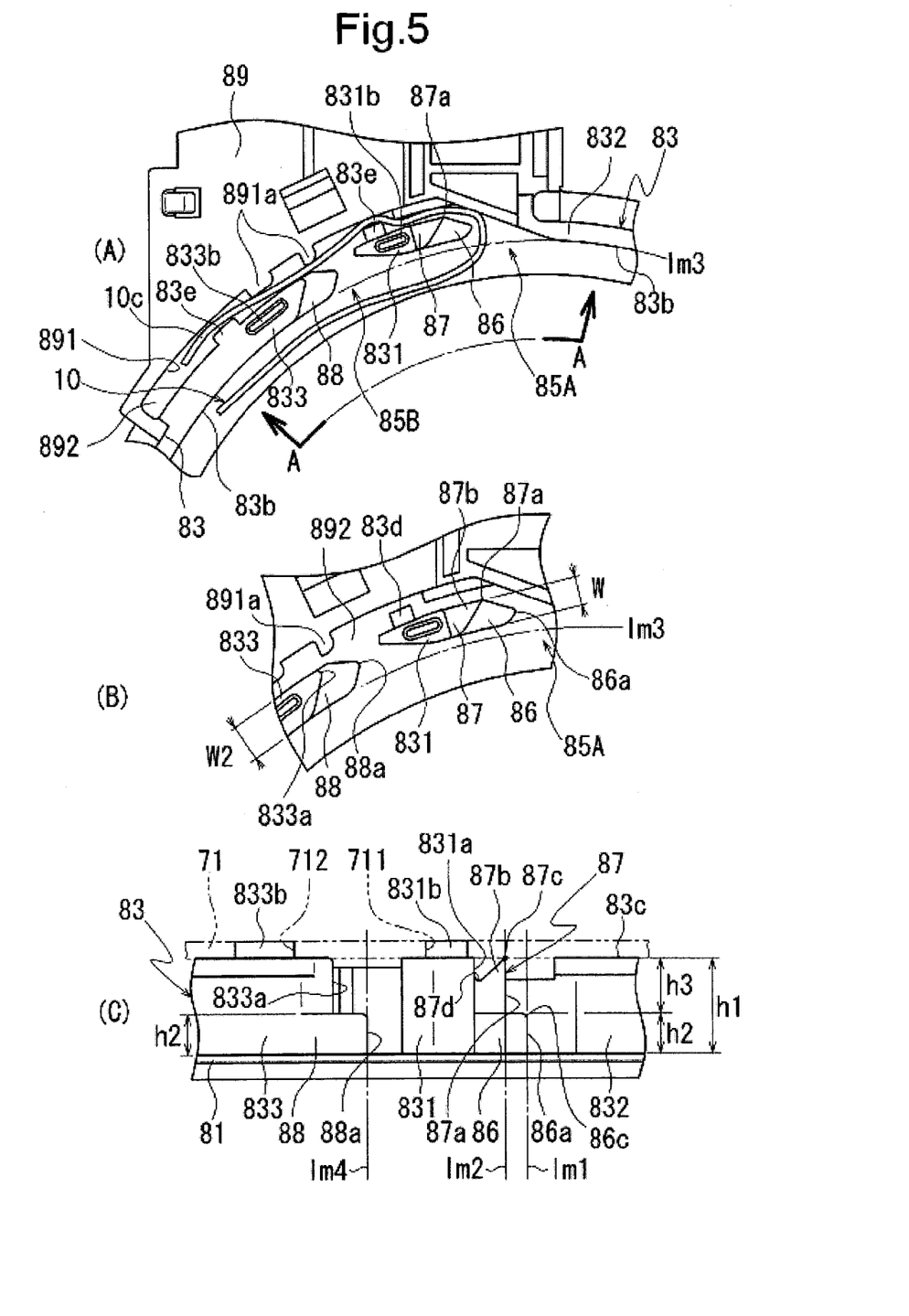
FIG. 5A, FIG. 5B and FIG. 5C are diagrams explaining the projection (cutter) provided in the stator according to the embodiment.

FIG. 4A is a plan view showing the cover 8 as viewed in the axial direction (from the side of the bottom cover 7), FIG. 4B is an enlarged perspective view showing a region A in FIG. 4A, and FIG. 4C is a diagram in which the flat cable 10 illustrated in FIG. 4B is omitted. FIG. 5A is an enlarged diagram showing the region A in FIG. 4A, FIG. 5B is a diagram shown by further enlarging the vicinity of openings 85 (85A and 85B) in FIG. 5A and a diagram in which the flat cable 10 is omitted in illustration, and FIG. 5C is a diagram in an arrow direction of A-A line in FIG. 5A and is a diagram in which the flat cable 10 is omitted in illustration.

As shown in FIG. 4A, the openings 85 (85A and 85B) are provided in the annular wall 83 to penetrate through the annular wall 83 in the thickness direction, and the flat cable 10b positioned at the outer diameter side of the spacer 9 is pulled out through the openings 85 (85A and 85B) outside of the annular space S (refer to FIG. 3). The openings 85 (85A and 85B) are provided in a connecting portion of the annular wall 83 to a connector portion 89, and are provided to have an interval therebetween in the circumferential direction around the axis X.

The openings 85 (85A and 85B) are provided across an entire length of the annular wall 83 in a height direction, and the annular wall 83 is divided in positions where the openings 85 (85A and 85B) are provided. A first projection portion 86 and a second projection portion 87 are provided in one side edge portion 831 of both side portions (side edge portions 831 and 832) of the annular wall 83 in the opening 85A to project toward the other side edge portion 832.

The first projection portion 86 and the second projection portion 87 line up in a height direction of the annular wall 83, and the first projection portion 86 is positioned at the side of the base portion 81 of the cover 8 (lower side in the figure). As shown in FIG. 5C, the first projection portion 86 in a rectangular shape as viewed in the inner diameter side is formed in the same height h2 across an entire length in the circumferential direction, and a tip end 86a thereof is positioned on a virtual line Im1 in parallel to the axis X (refer to FIG. 1). As shown in FIG. 5B, the first projection portion 86 has a radial width W which becomes narrower toward the tip end 86a as viewed in the axial direction, and the tip end 86a is subject to curved surface work. In the embodiment, one end 10c of the flat cable 10 goes through the opening 85A and is pulled out outside of the annular space S. Therefore at the time of pulling the flat cable 10 out of the opening 85A, the curved surface work is performed on the tip end 86*a* to prevent the flat cable 10 from being damaged by the tip end 86*a* of the first projection portion 86.

A corner portion 86*c* of the first projection portion 86 at the side of the second projection portion 87 as viewed in the inner diameter side makes contact with the flat cable 10 to put stress thereon for cutting at the time the flat cable 10 is pulled in a direction of being pressed against the first projection portion 86.

As shown in FIG. 5C, as viewed in the inner diameter side, the second projection portion 87 has a height h3 which is higher toward the side edge portion 832 by a substantially V-shaped recessed portion 87*d* provided at the side of the side edge portion 831, and has a sharp corner portion 87*b* upwards at the side of the side edge portion 832 to be formed in a peak shape. A tip end 87*a* of the second projection portion 87 at the side of the side edge portion 832 is positioned on a virtual line Im2 in parallel to the axis X. As shown in FIG. 5B, as viewed in the axial direction, the tip end 87*a* is positioned at a radial outside of a virtual line Im3 defining an inner peripheral surface 83*b* of the annular wall 83 and at a radial outside of the tip end 86*a* of the first projection portion 86.

As viewed in the axial direction, the second projection portion 87 has a radial width W which is smaller toward the tip end 87*a* to be formed in a triangle shape, and an apex portion 87*c* of the second projection portion 87 (refer to FIG. 5C) is positioned in the same height with a top surface 83*c* of the annular wall 83. Therefore the apex portion 87*c* of the second projection portion 87 makes contact with the base portion 71 of the bottom cover 7 from the side of the cover 8 at the time the cover 8 and the bottom cover 7 are incorporated.

In the embodiment, a corner R (curvature) of the apex portion 87*c* is set to 0.1 mm or less for certain cutoff of the flat cable 10.

An engagement projection 831*b* is provided on the top surface 83*c* of the side edge portion 831 in the annular wall 83 to project upwards toward the bottom cover 7. The engagement projection 831*b* is configured to be fitted in a fitting hole 711 provided in the base portion 71 of the bottom cover 7 at the time the cover 8 and the bottom cover 7 are incorporated (refer to FIG. 2). Accordingly in a state where the cover 8 and the bottom cover 7 are incorporated, the side edge portion 831 is supported by both of the cover 8 and the bottom cover 7. Therefore the flat cable 10 is pulled in a direction of making contact with the first projection portion 86 and the second projection portion 87, and the side edge portion 831 is not easily deformed even if the stress acts on the side edge portion 831 from the flat cable 10.

As shown in FIG. 5A, a third projection portion 88 is provided also in a side edge portion 833 in the opening 85B to project toward the side edge portion 831. As shown in FIG. 5C, the third projection portion 88 in a rectangular shape as viewed in the radial direction is formed in the same height h2 across an entire length in the circumferential direction, and a tip end 88*a* thereof is positioned on a virtual line Im4 in parallel to the axis X (refer to FIG. 1). As shown in FIG. 5B, the third projection portion 88 has a radial width W2 which becomes narrower toward the tip end 88*a* as viewed in the axial direction, and the tip end 88*a* is subject to curved surface work.

The side edge portion 833 also has a radial width W2 which becomes narrower toward a tip end 833*a*, and the tip end 833*a* of the side edge portion 833 peaks to be sharper than the tip end 88*a* of the third projection portion 88 and is positioned at a radial outside of the tip end 88*a*.

An engagement projection 833*b* is provided on the top surface 83*c* of the side edge portion 833 in the annular wall 83 to project upwards toward the bottom cover 7. The engagement projection 833*b* is configured to be fitted in a fitting hole 712 provided in the base portion 71 of the bottom cover 7 at the time the cover 8 and the bottom cover 7 are incorporated (refer to FIG. 2). Accordingly in a state where the cover 8 and the bottom cover 7 are incorporated, the side edge portion 831 is supported by both of the cover 8 and the bottom cover 7. Therefore the side edge portion 831 is not easily deformed even if the stress acts on the side edge portion 831.

An arc-shaped outer wall 891 as viewed in the axial direction is provided along the annular wall 83 at a radial outside of part of the annular wall 83 where the openings 85 (85A and 85B) are provided, and a groove 892 for accommodating the flat cable 10 pulled outside of the annular space S from the openings 85 (85A and 85B) is formed between the annular wall 83 and the outer wall 891.

As viewed in the axial direction, a part of the outer periphery of the annular wall 83, which opposes the outer wall 891, is provided with a plurality of projections 83*d* projecting to a radial outside to be spaced from each other in the circumferential direction. In addition, a plurality of projections 891*a* projecting to a radial inside are provided on the inner periphery of the outer wall 891 to be spaced from each other in the circumferential direction.

The projection 83*d* and the projection 891*a* are projected alternately in the circumferential direction of the annular wall 83. One end 10*c* of the flat cable 10 is accommodated in the groove 892 in a state of being sandwiched between the projection 83*d* and the projection 891*a*, thus preventing the movement of the one end 10*c* of the flat cable 10 (movement in a right direction in FIG. 5A). Therefore at the time the flat cable 10 positioned in the annular space S is pulled in a direction of making contact with the first projection portion 86 and the second projection portion 87, the one end 10*c* of the flat cable 10 is appropriately prevented from being pulled in the annular space S. In addition, even if a force of pulling the flat cable 10 is stronger, the flat cable 10 is certainly held in a position of making contact with the first projection portion 86 and the second projection portion 87, thus making it possible to certainly exert the stress from the projections (first projection portion 86 and second projection portion 87) on the flat cable 10.

As described above, according to the embodiment, in the rotary connector device in which the annular space S is formed between the rotor 2 and the stator 6 and the flat cable 10 connecting the connector at the side of the rotor 2 and the connector at the side of the stator 6 is provided in the annular space S, the stator 6 includes the annular wall 83 surrounding the annular space S and one end 10*c* of the flat cable 10 is pulled outside of the annular space S through the opening 85A provided in the annular wall 83, the first projection portion 86 and the second projection portion 87 are provided in the side edge portion 831 of the annular wall 83 at the opening 85A to project toward the side edge portion 832 positioned in an opposite side having the opening 85A therebetween, the first projection portion 86 is a projection in a rectangular shape as viewed in the inner diameter side (radial direction), and the second projection portion 87 is a projection in a peak shape as viewed in the inner diameter side (radial direction), wherein the first projection portion 86 and the second projection portion 87 line up in the height direction of the annular wall 83.

According to this configuration, when the flat cable 10 provided to go through the opening 85A and bridge between the inside and the outside of the annular space S is pulled in a direction of being pressed on the first projection portion 86 and the second projection portion 87, the stress due to the first projection portion 86 and the stress due to the second projection portion 87 act on the flat cable 10. Accordingly the acting point of the stress on the flat cable 10 can be increased as compared to a case where only one projection (cutter) is provided for cutting the flat cable 10. Therefore the flat cable 10 can be more certainly cut. Particularly at the time the flat cable 10 deviates largely from the neutral position, is wound around the spacer 9, and is strongly pulled to the first projection portion 86, even in a case where the flat cable 10 deviates toward the side (upper side of the first projection portion 86 in FIG. 4B) where the flat cable 10 leaves away from the first projection portion 86 in a height direction of the annular wall 83, the flat cable 10 can be more certainly cut by the second projection portion 87. In addition, since the second projection portion 87 is provided in the space which is conventionally not used, that is, in the space adjacent to the first projection portion 86 in the height direction of the annular wall 83 (space above the first projection portion 86 in FIG. 4B), it is not required to change a position or a shape of the opening 85A in the cover 8 for providing the second projection portion 87. As a result, an increase in size of the cover 8 is avoided, and an influence on costs due to providing the new component (second projection portion 87) can be suppressed.

In the circumferential direction of the annular wall 83, the tip end 86a of the first projection portion 86 as viewed in the inner diameter side is positioned closer to the side edge portion 832 positioned at the opposite side centered on the opening 85A than the tip end 87a of the second projection portion 87 as viewed in the inner diameter side.

According to this configuration, when the flat cable 10 provided to go through the opening 85A and bridge between the inside and the outside of the annular space S is pulled in a direction of being pressed on the first projection portion 86 and the second projection portion 87, the stress due to the first projection portion 86 first acts on the flat cable 10. When the retaining force of the corner portion 86c of the first projection portion 86 (refer to FIG. 4C) to the flat cable 10 is weak in this state, as the force of pulling the flat cable 10 is stronger, in some cases the flat cable 10 deviates to the side of the second projection portion 87. In this case, the second projection portion 87 in the peak shape makes contact with the flat cable 10 to exert the stress on the flat cable 10. Thereby the stress of the second projection portion 87 enables the flat cable 10 to be cut.

In addition, even in a case where the deviation of the flat cable 10 can not be suppressed by the second projection portion 87, since the sharp angle portion 87b of the second projection portion 87 damages the surface of the flat cable 10 at the time the flat cable 10 deviates, the damage of the flat cable 10 spreads at some midpoint of the deviating, making it possible to cut the flat cable 10. Further, since the sharp angle portion 87b of the second projection portion 87 is subjected to abrasion as compared to the first projection portion 86, when the fracture of the flat cable 10 is not performed successfully by the first projection portion 86 having made first contact with the flat cable 10, it is possible to extend the lifetime of the second projection portion 87 as the cutter by cutting the flat cable 10 with the second projection portion 87. Particularly in a case where the second projection portion 87 is made of a resin material more flexible than PTB, the lifetime of the second projection portion 87 as the cutter can be extended.

Further, since it is possible to certainly cut the flat cable 10 without forming the first projection portion 86 and the second projection portion 87 with a resin material including glass fiber with the aim at increasing the hardness, a reduction in manufacturing costs is possible because of not including the glass fiber.

As viewed in the axial direction of the annular wall 83, the apex portion 87c of the sharp angle portion 87b in the second projection portion 87 is positioned to a radial outside more than the tip end 86a of the first projection portion 86.

Since the inner peripheral surface 83b of the annular wall 83 forms a sliding surface on which the flat cable 10 wound around the spacer 9 slides, when the apex portion 87c of the sharp angle portion 87b is positioned in the inner diameter side, there is a possibility that the flat cable 10 is damaged. Therefore with the above configuration, the flat cable 10 sliding on the inner peripheral surface of the annular wall 83 can be appropriately prevented from being damaged at the regular operation of the rotary connector device 1.

The arc-shaped outer wall 891 as viewed in the axial direction of the annular wall 83 is provided outside of the annular wall 83, and one end 10c of the flat cable 10 extends in a direction of leaving away from the opening 85 in the circumferential direction of the annular wall 83 in a state of being interposed in the groove 892 between the annular wall 83 and the outer wall 891.

With this configuration, one end 10c of the flat cable 10 is certainly held in the groove 892, and when the flat cable 10 is pulled in a direction of making contact with the first projection portion 86 and the second projection portion 87, it is possible to appropriately prevent the one end 10c of the flat cable 10 from being pulled to the side of the annular space S. when the stress acts on the flat cable 10 from at least one of the first projection portion 86 and the second projection portion 87, as the one end 10c of the flat cable 10 is pulled in the side of the annular space S, the flat cable 10 can not be held in a state of being pressed against the first projection portion 86 or the second projection portion 87. Then, there occurs a possibility that the flat cable 10 can not be cut or the cutting timing of the flat cable 10 is delayed. Therefore with this configuration, it is possible to appropriately prevent the one end 10c of the flat cable 10 from being pulled in the side of the annular space S, and when the flat cable 10 is pressed against the first projection portion 86 or the second projection portion 87, that state can be held. This can prevent the event that the flat cable 10 can not be cut or the cutting timing of the flat cable 10 is delayed when the cutting of the flat cable 10 is required.

The part in the outer periphery of the annular wall 83, which opposes the outer wall 891, is provided with a plurality of projections 83d projecting to a radial outside to be spaced from each other in the circumferential direction. In addition, a plurality of projections 891a projecting to a radial inside are provided on the inner periphery of the outer wall 891 to be spaced from each other in the circumferential direction. The projection 83d of the annular wall 83 and the projection 891a of the outer wall 891 are provided alternately in the circumferential direction as viewed in the axial direction of the annular wall 83.

With this configuration, when the flat cable 10 is pulled in a direction of being pressed against the first projection portion 86 and the second projection portion 87 and the stress from at least one of the first projection portion 86 and the second projection portion 87 acts on the flat cable 10, it is possible to appropriately prevent the one end 10c of the flat cable 10 from being pulled in the side of the annular space S.

The stator 6 includes the cover 8 (first stator portion) having the annular wall 83, and the bottom cover 7 (second stator portion) having the ring-shaped base portion 71 (contact portion) making contact with the top end 83c of the annular wall 83. The bottom cover 8 fits each of plurality of the projections (projection 83e, top end portion 843, engagement projection 831b and engagement projection 833b) provided on the annular wall 83 in each of the corresponding fitting holes 713, 710, 711 and 712 of the base portion 71 to be incorporated in the bottom cover 7. The engagement projections 831b and 833b are provided in the side edge portions 831 and 833 of the annular wall 833 near the openings 85A and 85B.

With this configuration, the positions where the top ends of the side edge portions 831 and 833 make contact with the base portion 71 of the bottom cover 7 can be retained in predetermined positions in accordance with the fitting holes 711 and 712. In the configuration where the top ends of the side edge portions 831 and 833 simply make contact with the base portion 71 of the bottom cover 7, the positions where the top ends of the side edge portions 831 and 833 make contact with the base portion 71 of the bottom cover 7 change with stress exerted from the flat cable 10 caused also by that the base portion 81 supporting the side edge portions 831 and 833 is formed of a thin plate-shaped member, creating a possibility that a clearance is generated between the top ends of the side edge portions 831 and 833 and the base portion 71. For example, as the clearance is generated between the side edge portion 831 and the base portion 71 at the time the flat cable 10 is pressed against the first projection portion 86 and the second projection portion 87, there is a possibility that the flat cable 10 enters into this clearance, and therefore the flat cable 10 is not cut. With this configuration, however, since the generation of the clearance is suppressed, the occurrence of the event that the flat cable 10 is not cut can be appropriately prevented.

As viewed in the radial direction, the second projection portion 87 is provided with the tip end 87a which is at the side of the side edge portion 832 and is formed in a parallel, and linear shape to the tip end 86a of the first projection portion 86, and the V-letter shaped recessed portion 87d as viewed in the radial direction is provided in the second projection portion 87 at the side of the side edge portion 831. The recessed portion 87d forms the peak-shaped, sharp angle portion 87b that is narrower toward the tip end. The second projection portion 87 is configured to have the height h2 as viewed in the radial direction and the width W as viewed in the axial direction that are narrower from the side edge portion 831 toward the side edge portion 832.

With this configuration, the stress from the tip end 87a of the second projection portion 87 first acts on the flat cable 10 having made contact with the second projection portion 87 in the circumferential direction. In a case where the flat cable 10 is not cut by the stress from the tip end 87a, the flat cable 10 moves to a radial outside by the pulling force acting on the flat cable 10 to enter around the peak-shaped, sharp angle portion 87b. Then, the stress from the peak-shaped, sharp angle portion 87b acts on the flat cable 10 moving to a radial outside, thus certainly cutting the flat cable 10.

Further, as viewed in the radial direction of the annular wall 83, the apex portion 87c of the second projection portion 87 is configured to make contact with the base portion 71 of the bottom cover 7 with no clearance. As the clearance is generated between the apex portion 87c and the base portion 71, at the time the flat cable 10 is pulled and moves to the side of the sharp angle portion 87b of the second projection portion 87, in some cases the flat cable 10 enters into the clearance between the apex portion 87c and the base portion 71 without making contact with the apex portion 87c. In this case, there is a possibility that the flat cable 10 is not cut. When the apex portion 87c makes contact with the base portion 71 without any clearance, at the time the flat cable 10 is pulled and enters between the apex portion 87c and the base portion 71, the flat cable 10 can be certainly made in contact with the apex portion 87c to be cut.

The aforementioned embodiment shows an example where the second projection portion 87 is provided in the side edge portion 831 at the side of the opening 85A out of the openings 85A and 85B adjacent in the circumferential direction of the annular wall 83, but the second projection portion 87 may be further provided in the side edge portion 833 of the opening 85B or may be provided only in the side edge portion 833.

It should be noted that, the aforementioned embodiment shows an example where the apex portion 87c of the second projection portion 87 makes contact with the base portion 71 of the bottom cover 7 with no clearance, but a slight clearance may be present between the apex portion 87c and the base portion 71. In this case, when the apex portion 87c is provided to project to the side of the tip end 87a of the second projection portion 87 (right side in FIG. 5C), the side face of the flat cable 10 that will enter in the clearance can be damaged. Therefore it is possible to appropriately prevent the event that the flat cable 10 is not cut by entering into the clearance While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

DESCRIPTION OF REFERENCE SIGNS

1 Rotary connector device
2 Rotor
3 Rotor body
31 Base portion
32 Opening
33 Cylindrical wall
33a Projection
4 Liner
41 Base portion
42 Opening
43 Cylindrical wall
5 Attachment
51 Base portion
52 Engagement portion
52a Opening
6 Stator
7 Bottom cover
71 Base portion
72 Opening
73 Fitting wall
75a Tip end portion
76a Tip end
77 Engagement piece
77a Engagement hole
8 Cover
81 Base portion
82 Opening
83 Annular wall
83a Projection
83b Inner peripheral surface 83c Top surface
83d Projection
84 Engagement wall
841 Connecting portion
842 Engagement recessed portion
843 Top end portion
85A, 85B Opening
86 First projection portion
86a Tip end
86b Corner portion
87 Second projection portion
87a Tip end
87b Sharp angle portion
87c Apex portion
88 Third projection portion
88a Tip end
89 Connector portion
891 Outer wall
891a Projection
892 Groove
9 Spacer
91 Base portion
92 Rotor
93 Guide portion
10 (10a, 10b) Flat cable

What is claimed is:

1. A rotary connector device comprising:
a rotor;
a stator forming an annular space between the rotor and the stator; and
a flat cable provided in the annular space for establishing a connection between the side of the rotor and the side of the stator, wherein
the stator includes an annular wall surrounding the annular space,
the flat cable has one end which is pulled outside of the annular space through an opening provided in the annular wall,
a projection portion is provided in one of side edges of the opening opposing the annular wall in the circumferential direction to project toward the other side edge,
the projection portion includes a first projection formed in a rectangular shape as viewed in a radial direction, and a second projection formed in a peak shape as viewed in the radial direction, and
the first projection and the second projection line up in a height direction of the annular wall.

2. The rotary connector device according to claim 1, wherein
a tip end of the first projection in the circumferential direction is positioned closer to the side of the other side edge than a tip end of the second projection in the circumferential direction.

3. The rotary connector device according to claim 1 or 2, wherein

As viewed in an axial direction of the annular wall, a tip end of the second projection is positioned at a radial outside more than a tip end of the first projection.

4. The rotary connector device according to any of claims 1 to 3, wherein
an arc-shaped outer wall as viewed in an axial direction of the annular wall is provided outside of the annular wall, and
one end of the flat cable extends in a direction of leaving away from the opening in the circumferential direction of the annular wall in a state of being interposed between the annular wall and the outer wall.

5. The rotary connector device according to claim 4, wherein
part in the outer periphery of the annular wall, which opposes the outer wall, is provided with a plurality of projections projecting to a radial outside to be spaced from each other in the circumferential direction, and
a plurality of projections projecting to a radial inside are provided on the inner periphery of the outer wall to be spaced from each other in the circumferential direction, wherein the projection of the annular wall and the projection of the outer wall are provided alternately in the circumferential direction as viewed in the axial direction of the annular wall.

6. The rotary connector device according to any of claims 1 to 5, wherein
the stator 6 comprises a first stator portion including the annular wall, and a second stator portion including a ring-shaped contact portion making contact with a top end of the annular wall, wherein
the first stator portion fits each of a plurality of projections on the top end of the annular wall in each of the corresponding fitting holes provided in the contact portion to be incorporated in the second stator portion, and
at least one of the projections of the annular wall is provided near the one side edge of the opening.

7. The rotary connector device according to any of claims 1 to 6, wherein
as viewed in the radial direction, a tip end of the second projection at the side of the other side edge is formed in a parallel, and linear shape to a tip end of the first projection,
a V-letter shaped, recessed portion as viewed in the radial direction is provided at the side of the one side edge in the second projection portion, and
the second projection is formed in a peak shape that is narrower from the recessed portion toward the side of the tip end.

8. The rotary connector device according to any of claims 1 to 7, wherein
the second projection is formed to have a width as viewed in the radial direction and a width as viewed in an axial direction that are narrower as the second projection leaves away from the one side edge.

* * * * *